United States Patent [19]

Shimojima et al.

[11] 3,925,546

[45] Dec. 9, 1975

[54] ANTIBIOTIC NO. 156-B1 AND PROCESS FOR PRODUCTION THEREOF

[75] Inventors: Yukiji Shimojima, Tokyo, Japan; Isao Takeda, deceased, late of Japan; by Emiko Takeda, legal representative, Osaka, Japan; Masayuki Mizuno, Miyazaki, Japan; Yukiko Mizuno, Minamiohoizumi, Japan; Tadaaki Ohoka, Ohoi, Japan

[73] Assignee: Asahi Kasei Kogyo Kabushiki Kaisha, Osaka, Japan

[22] Filed: May 14, 1974

[21] Appl. No.: 469,778

Related U.S. Application Data

[63] Continuation-in-part of Ser. No. 336,459, Feb. 28, 1973, abandoned.

[30] Foreign Application Priority Data

Mar. 3, 1972 Japan.............................. 47-21542

[52] U.S. Cl.................................. 424/116; 195/80

[51] Int. Cl.$^2$......................................... A61K 35/00
[58] Field of Search...................... 424/116; 195/80

[56] References Cited
UNITED STATES PATENTS 3,651,217  3/1972  Goldstein.......................... 424/116

*Primary Examiner*—Jerome D. Goldberg
*Attorney, Agent, or Firm*—Cooper, Dunham, Clark, Griffin & Moran

[57] ABSTRACT

Antibiotic No. 156-B1 and a process for the production thereof are provided. The antibiotic is effective for the control of pathogenic microorganisms, including both gram positive and gram negative bacteria, their drug resistant strains, and yeasts. The antibiotic is produced by culturing *Streptomyces* No. 156 (NRRL 5319) in a liquid culture medium containing of carbon, and sources nitrogen and inorganic salts. The antibiotic which accumulates in the medium is isolated.

3 Claims, 2 Drawing Figures

ANTIBIOTIC NO. 156-B1 AND PROCESS FOR PRODUCTION THEREOF

This application is a continuation-in-part application Ser. No. 336,459 filed Feb. 28, 1973, now abandoned.

This invention relates to Antibiotic No. 156-B1 and a process for preparing same. Antibiotic No. 156-B1 is useful to control disease caused by pathogenic bacteria (grampositive and negative, and drug resistant strains) or yeasts, particularly, in the treatment of a variety of plant and animal diseases especially septicemia caused by *Streptococcus pyogenes* group A infections and diarrhea caused by *Escherichia coli* infestations. The antibiotic No. 156-B1 is obtained by culturing streptomyces No. 156 (NRRL 5319) in a culture medium.

Figure 1:
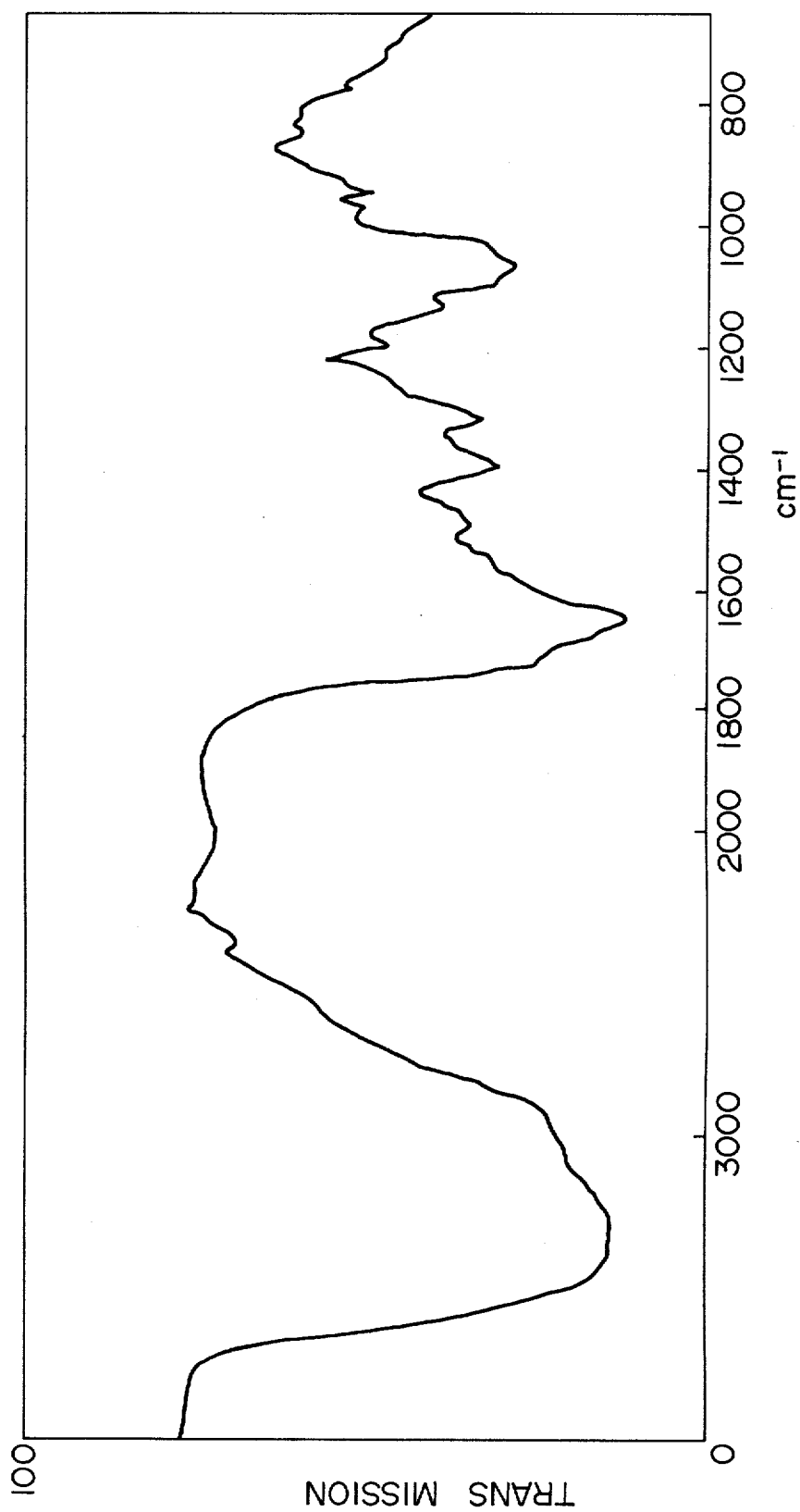

I. Physicochemical and biological characteristics of antibiotic No. 156-B1:
   a. The hydrochloride of this antibiotic shows the following physicochemical characteristics.
      1. Properties: White, powdery.
      2. Melting point: 200° – 203°C, decomposes with color changed to brown.
      3. Elementary analysis: C : 34.9%, H : 5.9%, N : 18.1%, O : 22.0%, Cl : 14.93%.
      4. Molecular formula: $C_{16}H_{29}N_6O_7Cl_2$
      5. Molecular weight: 480 by vapor pressure osmometer.
      6. Optical rotation: $[\alpha]_D^{18}$ –43.0° (1% in $H_2O$)
      7. Solubility: Easily soluble in water and methanol, slightly soluble in ethanol, and insoluble in higher alcohols, ethers, esters, ketones, chloroform, etc.
      8. Infrared absorption spectrum: As shown in FIG. 1.
      9. Ultraviolet absorption spectrum: No characteristic absorption is observed within the zone from 220 m$\mu$ to 400 m$\mu$
      10. Color reaction: Elson-Morgan reaction, Molisch reaction, Tollens reaction, anthrone reaction and ninhydrin reaction . . . +.
          Decolors potassium permanganate solution, when alkaline with sodium carbonate.
          Maltol reaction, biuret reaction, Pauli reaction and Sakaguchi reaction . . . ±
          Fehling reaction, Benedict reaction, ferric chloride reaction and Ehrich reaction . . . –
      11. Stability: Stable at pH7 – pH2 Extremely unstable in an alkaline solution and immediately inactivated.
      12. Rf values on paper chromatogram: 0.35 (n-propanol : pyridine : acetic acid : water = 15 : 10 : 3 : 12 v/v), 0.29 (n-butanol : pyridine : acetic acid : water = 15 : 10 : 3 : 12 v/v), 0.05 (n-butanol saturated with water), 0.91 (1.5% $NH_4Cl$ solution), 0.44 (75% phenol), 0.04 (50% acetone), 0.51 (mixture consisting of 40 ml of n-butanol, 10 ml of methanol, 20 ml of water and 1.5 g of methyl orange), 0.03 (n-butanol : methanol : water = 40 : 10 : 20 v/v), 0.00 (benzol : methanol = 4 : 1), 0.05 (water), 0.05 (n-butanol saturated with water + 0.2% paratoluene sulfonic acid).

b. Biological properties
      1. The antimicrobial activity of the present was tested on the various microorganisms indicated below.

Table 1

| Test microorganisms | Minimum inhibitory concentration ($\mu$g/ml) |
|---|---|
| *Micrococcus flavus* IFO 3242 | 2.5 |
| *Corynebacterium spedonicum* IFO 3306 | 100 |
| *Bacillus subtilis* | ≦1 |
| *Staphylococcus aureus* FDA 209 | 2.5 |
| *Staphylococcus aureus* STF* | 25 |
| *Streptococcus pyogenes* group A | 2.5 |
| *Serratia marcescens* IFO 3046 | >100 |
| *Proteus vulgaris* IFO 3045 | 25 |
| *Pseudomonus aeruginosa* | 25 |
| *Escherichia coli* K-12 | 2.5 |
| *Escherichia coli* WG-823** | 2.5 |
| *Vibro metshnikovii* IAM 1039 | 2.5 |
| *Xanthomonas citri* IFO 3835 | >100 |
| *Xanthomonas oryzae* IAM 1657 | >100 |
| *Mycobacterium* 607 | 1 |
| *Candida albicans* IFO 0583 | 50 |
| *Saccharomyces cerevisiae* Hansen Kyokai-B | 25 |
| *Glomerolla lagenarium* IAM 8053 | >100 |
| *Trycophyton mentagrophytes* IAM 5064 | >100 |
| *Alternaria kikuchiana* TANAKA IAM 5005 | 50 |
| *Fusarium oxysoporum* | 100 |
| *Aspergillus oryzae* L | >100 |
| *Aspergillus niger* ATCC 6275 | >100 |
| *Rhizopus nigicans* | ≧100 |
| *Penicillium citrinum* | ≧100 |

*Streptothricin — resistant strain.
**SA, PC, SM, TC, CEP, SA and CP — resistant strains.

The test was performed by an agar streak method. Nutrient agar was used for bacteria and yeasts, malt-yeast extract agar for fungi, and 5% glycerin-nutrient agar for Mycobacterium 607, respectively.

Activities ($PD_{50}$) against mouse infection models are:

E. coli              7 mg/kg
S. pyogenes group A     120 mg/kg
(by subcutaneous injection all)

2. Toxicity: The lethal dosage, $LD_{50}$, of this antibiotic as tested on mice through intravenous injection was found to be 100 – 150 mg/kg.
3. Application form: The antibiotic may be used in the form of a pharmaceutically acceptable salt such as hydrochloride, sulfate or acetate.

c. Comparison of the present antibiotic with other antibiotics Numerous water-soluble basic antibiotics have been discovered to date. Neothricin and Racemomycin A and antibiotics which exhibit properties similar to those of the present antibiotic in infrared absorption spectrum, optical rotation, melting point, pH value on paper chromatogram, etc. These antibiotics are compared in the following Tables (Tables 2, 3 and 4).

Table 2

| | Comparison of antibiotic 156-B1 with known antibiotics | | | | |
|---|---|---|---|---|---|
| Antibiotics | 156-B-1 | Neothricin | Racemomycin A | Streptothricin | BY-81 |
| Salt form | HCL | HCL | $H_2SO_4$ | $H_2SO_4$ | HCL |
| mp. (°C) | 200 – 203 (dec.) | 207 – 213 (dec.) | 213 – 214 (dec.) | 213 – 214 (dec.) | 142 – 143 (dec.) |

Table 2-continued

| Anti-biotics | Comparison of antibiotic 156-B1 with known antibiotics | | | | |
|---|---|---|---|---|---|
| | 156-B-1 | Neothricin | Racemomycin A | Strepto-thricin | BY-81 |
| $[\alpha]_D$ | −43.0°(18°C) | −43.27°(20°C) | −34.8°(14°C) | −49°(25°C) (HCL) | −60°(20°C) |
| Fehling | − | + | | + | Doubtful |
| Benedict | − | + | − | + | Doubtful |
| TLC[a] | | | See Table 4 (Fig.) | | See Table 4 (Fig.) |

[a]Thin layer chromatography

Table 3

Comparison of M.I.C. values of antibiotic No. 156-B1 with those of Neothricin

| Test organisms | M.I.C. (μg/ml) | |
|---|---|---|
| | 156-B1 | Neothricin |
| Bacillus subtilis | 1 | 10 |
| Staphylococcus aureus FDA 209P | 2.5 | 10 |
| Pseudomonas aeruginosa | 25 | 100 |
| Xanthomonas oryzae | >100 | 5 |
| Trichophyton mentagropytes | ≧100 | 20 |

The antibiotic 156-B1 required higher concentrations than Neothricin with respect to *Xanthomonas oryzae* and *Trichopyton mentagrophytes* but was effective at lower concentrations with respect to the other microorganisms.

Table 4

Figure 2:
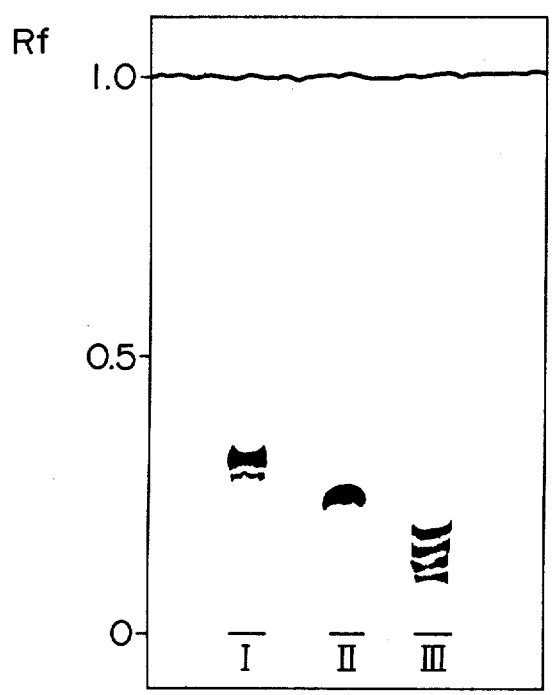

Comparison of thin-layer chromatograms of antibiotic 156-B1, racemomycin and BY-81 (FIG. 2)

| Adsorbent | : | Avicel (Funakoshi Pharmaceutical Co.) |
|---|---|---|
| Developer | : | n-Butanol-pyridin-acetic acid-water (15:10:3:12, v/v) |
| Detection | : | ninhydrin |
| I | : | BY-81 (hydrochloride) |
| II | : | antibiotic (156-B-1) (hydrochloride) (Rf=0.26) |
| III | : | racemomycin A, B and C (hydrochloride) |

In view of these results it has been concluded that 156-B1 is a novel substance.

As concerns other salts, the acetate of the present antibiotic, for example, is hygroscopic and readily soluble in methanol and ethanol. (The hydrochloride is slightly hygroscopic, readily soluble in methanol and hardly soluble in ethanol.) The sulfate is soluble in methanol and much less soluble in ethanol. Both salts are easily soluble in water.

II. Production:

Antibiotic 156-B1, is obtained by culturing *Streptomyces* No. 156 (NRRL 5319) under suitable conditions.

The microorganism was isolated from soil collected in Ikeda City of Osaka Prefecture. This strain is cultured by a generally known method for the culture of actinomyces. Specifically, it is aerobically cultured in a medium containing carbon sources, nitrogen sources, inorganic salts, etc. at 25°C − 35°C for two to five days. The antibiotic accumulates in the medium.

The microbial characteristics of the microorganism are as follows:

I. Morphological characteristics:

Starch-inorganic salts medium and the potato-glucose medium. Good growth with branching internal mycelium. Good aerial mycelium abundant with spiral ends (two or more rotations). Sporophores do not form whorls. Spores oval, 0.8 − 0.9 by 1.2 − 1.4 μ in size and smooth on the surface.

II. Behavior on Various Culture Media:
 1. Czapek's agar: Good growth, white surface circumference with bluish ash-gray interior and ivory reverse. Aerial mycelium somewhat bluish ash-white powder, abundant. No soluble pigment.
 2. Asparagine-glucose agar: Growth somewhat suppressed, substantially colorless, glossy surface. No aerial mycelium establishment. No pigment production.
 3. Ca-malate agar: Good growth, substantially colorless, later becoming bright ash-gray. Aerial mycelium powdery and ash-gray. No pigment production.
 4. Glucose-Czapek broth: Moderate surface growth, dark gray. Aerial mycelium scant, ash-gray. No pigment production
 5. Nutrient agar: Moderate, flat growth, milky brown, no aerial mycelium establishment. Scant brown pigment.
 6. Loeffler's serum: Poor growth, bluish black on the first to second day, later becoming milky brown. No aerial mycelium establishment. No soluble pigment production.
 7. Peptone-glucose agar: Good growth with wrinkled colonies, grayish pale brown. No aerial mycelium establishment. Scant yellowish brown pigment.
 8. Egg-albumin agar: Grayish white growth with powdery, ash-gray mycelium. No pigment production.
 9. Gelatin: Surface growth, slightly brownish white, gelatin liquefaction. Scant brown pigment.
 10. Starch agar: Good growth, yellowish green reverse and slightly whitish circumference. Aerial mycelium abundant, pale purple, powdery. No pigment production.
 11. Tyrosin agar: Growth restricted to flat small colonies. Aerial mycelium slightly grayish, powdery, Active melamin formation.
 12. Litmus milk: Surface growth of grayish cream color. Milk peptonized without coagulation.
 13. Cellulose medium: No growth.

III. Utilization of Carbon Sources:

| glucose | ++ |
|---|---|
| sucrose | ++ |
| galactose | ++ |
| maltose | ++ |
| xylose | + |
| arabinose | + |
| fructose | + |
| rhamnose | + |
| raffinose | + |
| mannitol | + |

-continued

| | |
|---|---|
| inositol | ± |
| lactose | + |
| inulin | + |
| sorbitol | + |
| sodium succinate | ± |
| sodium citrate | ± |
| salicin | − |
| sodium acetate | − |

The various properties described above clearly indicate that the present microorganism possesses features which are characteristic of microorganisms belonging to genus *Streptomyces*.

These properties have been examined in comparison with the properties of numerous microorganisms of genus Streptomyces described in Bergy's "Manual of Determinative Bacteriology" 7th edition (1957) and Waksman's "The Actinomycetes" 2nd edition (1961). It was found that, in morphological characteristics, the microorganism resembles *Streptomyces albus* and *Streptomyces calvus* in that the sporophores are not branched in whorl but have their ends spiral several rotations in the starch-inorganic salts medium and the potato-glucose medium, that the spores are smooth on the surface and are elliptical, and that the pigment-producing ability is extremely weak in protein-containing media and practically absent in snythetic media. However, the microorganism shows high melamin-producing ability in a tyrosin agar medium, whereas the comparison species produce no melamin. Further, the present microorganism is characterized by producing aerial mycelium in bright purple color or bright purple color tinged slightly with rose color on the starch-agar medium, whereas the known species mentioned above have white or grayish aerial mycelium on the same medium.

Strains productive of water-soluble basic antibiotic substances similar to Antibiotic 156-B1 have been discovered in *Streptomyces lavendulae* and variants thereof. In morphological and physiological characteristics, these strains bear resemblance to *Streptomyces* No. 156. However, they can be clearly distinguished by the following points. The strains of *Streptomyces lavendulae* invariably are highly productive of brown pigments in protein-containing media, while the present microorganism shows a very poor pigmentproducing ability in protein-containing media. As concerns the color of the aerial mycelium formed on various media, the strains of *Streptomyces lavendulae* form aerial mycelia of rather dark colors such as ash-brown, yellow-brown, or pale-purple while the present microorganism generally forms aerial mycelia of ash-white color in most cases in media other than starch medium.

Accordingly, the present microorganism has been judged to be a new strain and, therefore, has been denominated as *Streptomyces* No. 156.

For the purpose of the present invention, not merely *Streptomyces* No. 156 but also natural and artificial mutants thereof can be used.

The microorganism of the present invention is cultured following procedures which are generally practiced for actinomyces. Examples of the carbon source which may be used in the medium include starch, corn starch, dextrin, glycerin, glucose, maltose, sucrose and molasses. Examples of nitrogen sources which are usable are peptone, meat extract, soybean flour, corn steep liquor, cottonseed flour and yeast extract.

The inorganic salts which are suitable for the medium are phosphates, potassium salts, magnesium salts, sodium chrolide and calcium carbonate, for example. The yield of the antibiotic is highest when soybean flour and starch are used in combination. The inorganic salts are incorporated into the medium in concentrations generally used for the culture of microorganisms. The pH value of the medium is in the range of from 5 to 8. The aforementioned strain is inoculated to the medium and cultured aerobically at 25°C − 35°C for 2 to 5 days.

The recovery of the antibiotic from the cultured medium is accomplished by the utilization of physico-chemical properties of the antibiotic. As already described, antibiotic 156-B1 is a basic, water-soluble substance which is soluble in methanol, water-containing lower alcohols and water but is only slightly soluble or entirely insoluble in other ordinary organic solvents. It tends to be decomposed and inactivated on the alkaline side but is stable at pH 2 − 7.

Antibiotic 156-B1 is preponderantly accumulated in the medium filtrate. Thus, it is more advantageous to isolate the antibiotic immediately from the medium filtrate. To be more specific, the culture solution is filtered and an alkaline solution, e.g., NaOH is added to a supernatant to adjust the pH to from pH 7 − 7.5. The filtrate is passed through a column packed with Amberlite IRC-50 ($H^+$ form) made by Rohm and Haas Company to absorb the antibiotic 156-B1 on the ion-exchange resin. The column is washed first with water and then eluted with, for example, a dilute acid solution. The acid employed for the elution determines the form of salt of the antibiotic finally obtained, for example, hydrochloride, sulfate or acetate when elution is with dilute hydrochloric acid, sulfuric acid or acetic acid, respectively.

The eluate is subjected to chromatography. The fraction which shows antibacterial activity against Bacillus subtilis is collected and neutralized with a weakly basic anion-exchange resin such as, for example, Amberlite IR-45 ($OH^-$ form) made by Rohm and Haas Company. The neutralized solution is passed through a column of active carbon to remove inactive contaminants, mainly pigments. The colorless and clear filtrate is concentrated to a syrupy state and finally freeze-dried. The freeze-dried powder was extracted with methanol for elimination of components insoluble in methanol. The clear solution consequently obtained is gradually added to about ten times as large a $C_2$−$C_3$ alcohol or acetone, while under agitation. The mixture is left to stand overnight in a cool room to precipitate antibiotic 156-B1 as a salt. When this precipitate is collected and dried, a crude-grade salt of 156-B1 is obtained in the form of a white powder.

EXAMPLE 1

*Streptomyces* No. 156 is inoculated to 500-ml Sakaguchi flasks each containing 100 ml of a medium containing 2% of molasses, 2% of glucose, 2% of corn steep liquor, 1% of deoleated soybean meal and 0.2% of calcium carbonate (pH 7.0 before sterilization) and subjected to shake culture at 30°C for 72 hours. A total of 3 liters of culture solution thus produced is centrifuged to separate cells. The supernatant was adjusted to pH 7 − 7.5 with 3N NaOH solution, then passed downflow through a column packed with 100 ml of an $H^+$ form ion-exchange resin, IRC-50. The column is washed with water and then eluted with a 0.1N HCl solution. The elute is further subjected to cellulose column chromatography using the following eluation solvent: iso-propanol : acetic acid : water (8 : 1 : 4, v/v), in order to separate the desired antibiotic from other antibacterial substances which are produced simultaneously within the culture solution. The eluate is further subjected to thin-layer chromatography with Avicel plate (made by Funakoshi Pharmaceutical Co., Ltd.) using an eluting solvent having mixture of propanol, pyridine, acetic acid and water (15 : 10 : 3 : 12 by volume). Ninhydrin color reaction and bio-autography of *Bacillus subtilis* are applied to the final eluate in order to collect only the portion having the highest Rf value. A total of 500 ml of a fraction having high activity was obtained. This solution is neutralized with IR-45 (OH⁻ form) and subsequently passed through a column packed with chromatography-grade active carbon made by Wako Junyaku. At pH values below 8, 156-B1 is adsorbed very little by active carbon. The column is washed with 100 ml of water. The effluent and the washings are combined and concentrated at a temperature of 50°C or below until half dry, and then extracted repeatedly with anhydrous methanol. The resultant extract is concentrated to about 3 ml under reduced pressure. The concentrated extract was added into 30 ml of anhydrous ethanol while under agitation and the solution left to stand overnight in a refrigerator. The precipitate is collected, washed with a small volume of ethanol and dried in vacuum to produce 480 mg of crude hydrochloride of 156-B1 in a white, powdery form.

EXAMPLE 2

*Streptomyces* No. 156 is inoculated to 500-ml Sakaguchi flasks each containing 100 ml of medium containing 2% of soluble starch, 1% of deoleated soybean meal, 0.1% of potassium phosphate II, 0.3% of sodium chloride, 0.05% of magnesium sulfate and 0.2% of calcium carbonate (pH 7.0 before sterilization) and subjected to shake culture at 30°C for 24 hours. A total of 250 ml of culture broth thus obtained is placed in a 10-liter jar fermentor containing 5 liters of medium of the same composition and cultured at 30°C for 40 hours while under aeration at the rate of 5 liters per minute and agitation at the rate of 350 revolutions per minute. After completion of the culture, the precipitate portion is removed by a continuous centrifugal separator to obtain the supernatant. The supernatant is adjusted to pH 7 - 7.5 with an alkali solution and then passed downflow through a column packed with 200 ml of ion-exchange resin IRC-50 (H⁺ form). Thereafter, the procedure of Example 1 is repeated to carry out elution with hydrochloric acid, neutralization, decolorization and methanol extraction. Consequently, there is obtained 720 mg of hydrochloride of crude 156-B1 in a white, powdery form.

EXAMPLE 3

*Streptomyces* No. 156 is inoculated to 500-ml Sakaguchi flasks each containing 100 ml of medium incorporating 2% soluble starch, 1% glycerin, 3% C.S.L., 0.2% $K_2HPO_4$, 0.05% of $MgSO_4 \cdot 7H_2O$, 0.3% of NaCl, and 0.2% of $CaCO_3$ (pH 7.0 before sterilization) and subjected to shaken culture at 27°C for 24 hours. A total of 250 ml of culture solution consequently obtained is placed in a 10-liter jar fermentor containing 5 liters of a medium of the same composition and cultured at 27°C for 72 hours while under aeration at the rate of 5 liters per minute and the agitation carried out at the rate of 350 revolutions per minute. After completion of the culture, the cells are separated by filtration and the supernatant collected. The supernatant is adjusted to pH 7 - 7.5 with an alkali solution and passed downflow through a column packed with 200 ml of ion-exchange resin IRC-50 (H⁺ form). The column is washed first with water and then with 0.05N sulfuric acid. The fraction having activity against *Bacillus subtilis* is collected and neutralized with IR-45 (OH⁻ form). The neutralized solution is concentrated to a syrupy state and 10 to 20 times its volume of acetone added. The white precipitate is separated by filtration and extracted with methanol. The extract is concentrated to a sprupy state and about ten times its volume of ethanol is added with agitation. The precipitate consequently formed is collected, washed with ethanol and dried to obtain 830 mg of hydrochloride salt of crude 156-B1.

EXAMPLE 4

In 5-ml portions of water, 400-mg portions of hydrochlorides of crude 156-B1 obtained in Example 1 and Example 2 are dissolved. The solutions are each adsorbed each in a column (3.5 cm in inside diameter and 80 cm in length) packed with cellulose (cellulose powder "A" made by Toyo Filter Co.) using a mixed solvent containing isopropanol, acetic acid and water mixed in a proportion of 8 : 1 : 4. the same solvent is passed downflow at the feed rate of 10 ml/20 minutes to effect chromatographic separation. The fraction manifesting antibacterial activity is detected by the pulp disk method using *Bacillus subtilis* as the test microorganism. This fraction is placed on an Avicerl thin layer and developed using a mixed solvent containing n-propanol, pyridine, acetic acid and water in a proportion of 15 : 10 : 3 : 12. The fraction which showed a uniform spot at Rf 0.33 – 0.35 with ninhydrin is collected and concentrated under reduced pressure. After concentration to a syrupy state, it is dried by lyophylization, dissolved in 1 ml of methanol and thereafter added, while under agitation, to 10 ml of ethanol. The product formed is separated, washed with a small volume of ethanol and dried in vacuum to provide 78 mg of hydrochloride of refined 156-B1 in a white, powdery form. This substance exhibits properties characteristic of hydrochloride of 156-B1 as described previously.

What is claimed is:

1. Antibiotic No. 156-B1 having an elementary analysis of 34.9% C, 5.9% H, 18.1% N, 22.0% O and 14.93% Cl, an optical rotation of $[\alpha]_D^{18}$ −43.0° (1% in $H_2O$), a melting point of 200° – 203°C, a decomposition color of brown, a molecular weight of 480 by the vapor pressure osmotic method, and exhibiting the infrared absorption spectrul illustrated in FIG. 1, or a pharmaceutically acceptable salt thereof selected from the group consisting of the hydrochloride, sulfate and acetate salts.

2. A process for producing antibiotic No. 156-B1 or a pharmaceutically acceptable salt as defined in claim 1, which comprises aerobically culturing the antibiotic No. 156-B1 producing microorganism *Streptomyces* No. 156 NRRL 5319 in a medium containing sources of carbon, nitrogen and inorganic salts until a substantial antibiotic activity is imparted to said medium and recovering the antibiotic or the salt thereof from the culture solution.

3. A process according to claim 2, wherein the microorganism is cultured at 25°C – 35°C at pH 5 – 8 for 2 to 5 days.

* * * * *